United States Patent [19]

Maurice et al.

[11] Patent Number: 5,004,591

[45] Date of Patent: * Apr. 2, 1991

[54] CATALYTIC PROCESS FOR REMOVAL OF HYDROGEN SULFIDES FROM LIQUID SULFUR

[75] Inventors: Jacques Maurice, Pau; Romain Fouque, Poey de Lescar; Jean-Louis Auriol, Pau, all of France

[73] Assignee: Societe Nationale Elf Aquitaine (Production), Paris La Defense, France

[*] Notice: The portion of the term of this patent subsequent to Jan. 30, 2007 has been disclaimed.

[21] Appl. No.: 398,789

[22] Filed: Aug. 25, 1989

Related U.S. Application Data

[62] Division of Ser. No. 171,878, filed as PCT FR87/00268 on Jul. 8, 1987, published as WO88/00570 on Jan. 28, 1988, Pat. No. 4,897,251.

[30] Foreign Application Priority Data

Jul. 10, 1986 [FR] France .................... 86 10063

[51] Int. Cl.[5] ............. B01J 31/02; B01J 31/04; C01B 17/027
[52] U.S. Cl. ................ 423/578 R; 502/164; 502/167
[58] Field of Search .......... 423/578 R; 502/164, 502/167, 168, 170, 172; 252/183.13, 309; 568/589, 704; 564/504

[56] References Cited

U.S. PATENT DOCUMENTS

| | | | |
|---|---|---|---|
| 2,838,391 | 6/1958 | Kaufman et al. | 423/578 R |
| 3,447,903 | 6/1969 | Wiewiorowski | 423/578 R |
| 3,664,966 | 5/1972 | Gordon | 502/164 |
| 3,717,600 | 2/1973 | Dalhuiser et al. | 252/309 |
| 4,054,605 | 10/1977 | Watts, Jr. et al. | 564/504 |
| 4,070,383 | 1/1978 | Rutledge | 502/170 |
| 4,152,284 | 5/1979 | Morlock et al. | 502/164 |
| 4,393,037 | 7/1983 | Delaney et al. | 423/578 R |
| 4,612,020 | 9/1986 | Fischer et al. | 423/578 R |
| 4,897,251 | 1/1990 | Maurice et al. | 423/578 R |

FOREIGN PATENT DOCUMENTS

38-1710  3/1963  Japan ................ 423/578 A

Primary Examiner—Jeffrey E. Russel
Attorney, Agent, or Firm—Burgess, Ryan & Wayne

[57] ABSTRACT

The invention is an improved catalytic process for removing $H_2S$ and sulfanes from liquid sulfur and a catalyst system for carrying out the process. The catalyst comprises a basic component and a surfactant component.

25 Claims, 1 Drawing Sheet

CATALYTIC PROCESS FOR REMOVAL OF HYDROGEN SULFIDES FROM LIQUID SULFUR

This is a division of application Ser. No. 171,878, filed as PCT FR87/00268 on Jul. 8, 1987, published as WO88/00570 on Jan. 28, 1988, now U.S. Pat. No. 4,897,251.

The invention is a process for the quick removal of $H_2S$ present in liquid sulfur in a dissolved state alone or with hydrogen polysulfides. The invention is also a catalytic system that can be used for carrying out the process.

BACKGROUND OF THE INVENTION

Large quantities of sulfur are produced by the CLAUS process by reacting hydrogen sulfide originating, for example, from deacidification of natural gas or from treatments of petroleum products with the sulfur dioxide formed, for example, by combustion of $H_2S$ or also by combustion of sulfur or sulfur-containing compounds such as pyrites, according to the reaction:

$$2H_2S + SO_2 \rightleftharpoons 3S + 2H_2O$$

A substantial fraction of the sulfur produced by the CLAUS process is stored in the liquid state in heat-insulated tanks, then transported in liquid form to the places of use by utilizing transportation means such as tank trucks, tank barges, tank cars, or also pipelines provided with adequate heat-insulating means that allow the sulfur to remain liquid during the transportation.

The liquid sulfur obtained by the CLAUS process always contains a small amount of dissolved $H_2S$ and hydrogen polysulfides, also called sulfanes, of the formula $H_2S_x$ wherein x represents a number equal to or more than 2. The sulfanes slowly decompose as time passes, releasing $H_2S$. The gaseous phase above the liquid sulfur in the storage tank or in the container used for its transportation includes, therefore, a certain proportion of $H_2S$, which, due to the toxicity of the gas and its tendency to spontaneous inflammation, makes the operations associated with the loading and unloading of the containers that serve for the transportation of the liquid sulfur dangerous. In order that these operations can be performed safely, the CLAUS liquid sulfur is generally subjected, prior to storage and transportation, to a gas-removal treatment, the purpose of which is to lower the content of free and combined $H_2S$ of the liquid sulfur below a threshold that the practice has determined to be 10 ppm.

The total amount of $H_2S$ and of sulfanes in the CLAUS liquid sulfur is generally comprised between 50 and 700 ppm and generally depends on the concentration of $H_2S$ in the gaseous phase above the liquid sulfur and on the temperature of liquid sulfur. In addition, the relative proportions of free $H_2S$ and sulfanes dissolved in the liquid sulfur depend also on the temperature of the liquid sulfur.

The process of removal of the $H_2S$ present in the liquid sulfur in free and combined forms includes two phases, a first phase in which the sulfanes are decomposed according to the reaction $H_2S_x \rightarrow H_2S + S_{x-1}$ and a second phase in which the released and simply dissolved $H_2S$ and the light sulfanes are separated from the liquid sulfur.

The decomposition of the sulfanes to $H_2S$ and sulfur is a slow reaction. The rate of removal of the $H_2S$ and light sulfanes is limited by the speed of the decomposition reaction.

Most of the processes suggested for removing the free and combined $H_2S$ dissolved in the liquid sulfur, are of the type in which a catalytic system formed by one or more compounds consisting of ammonia or compounds that release ammonia, or compounds having a basic character in the sense of BRONSTEDT are added to the sulfur. The catalyst system facilitates the decomposition of the sulfanes, the released $H_2S$ being simply dissolved in the sulfur is separated from the liquid sulfur by any technique that allows the $H_2S$ dissolved physically to escape from the liquid sulfur or to be transformed in situ to sulfur under the action of an oxidizing gas. In particular, in the process disclosed in EP-0045636, the catalytic system consists of a compound selected from inorganic compounds of phosphorus, urea, urea derivatives, dithionates, dithionites, thiosulfates, bisulfides, and bisulfites. In the processes described in U.S. Pat. No. 3,364,655, FR No. 2,159,691 and U.S. Pat. No. 4,131,437, ammonia is used as the catalyst and the $H_2S$ released by decomposition of the sulfanes is removed by atomizing the liquid sulfur (U.S. Pat. No. 3,364,655), by stripping with an inert gas (FR-2,159,691), or by sweeping the open surface of the liquid sulfur by means of a gas such as water vapor, nitrogen, air or residual gas from a sulfur plant (U.S. Pat. No. 4,131,437). The use of a catalytic system of the type which utilizes ammonia, ammonium salts, amines and other nitrogenous compounds has also been proposed in FR No. 2,185,587 and U.S. Pat. No. 3,447,903 with transformation in situ to sulfur of the $H_2S$ released by decomposition of the sulfanes by the action of an oxidizing gas, namely, air, in the first case and $SO_2$ in the second case, injected into the liquid sulfur.

The above cited processes have the inconvenience of slow reaction rates which hinder carrying out the process continuously at the exit from a sulfur manufacturing process. In effect, the processes disclosed require several hours, for example, at least 2.5 hours when using a catalytic system formed by the compounds disclosed in EP-0045636, or at least from 5 to 8 hours when using ammonia as the catalytic system to obtain a liquid sulfur having a content of free and combined $H_2S$ below the level required by the standards (10 ppm).

BRIEF DESCRIPTION OF THE INVENTION

It has now been discovered that it is possible to improve the activity of the compounds of basic character used as catalysts in the processes for removal of free and combined $H_2S$ present in the liquid sulfur by adding to the mixture of liquid sulfur and catalyst at least one surfactant compound. The addition of surfactant reduces the duration of treatment of the liquid sulfur and overcomes the problems of a continuous process. In addition, the amount of catalyst required in the modified process needed to bring the $H_2S$ content of the liquid sulfur to the desired value below the threshold level is sufficiently small that it does not significantly increase the ash content of the treated sulfur.

The invention is a process for rapid decomposition and removal of $H_2S$ present in the liquid sulfur, either in a simply dissolved state or combined as hydrogen polysulfides, of the type wherein a catalytic system containing one or more compounds of basic character is admixed with the liquid sulfur and the liquid mixture is maintained at an elevated temperature to remove the hydrogen sulfide from the liquid sulfur, characterized in that said catalytic system includes at least one surfactant compound.

The catalyst component comprising the basic compound or compounds and the component comprising the surfactant compound or compounds, can be added to the liquid sulfur either separately or in the form of a pre-formed mixture. In a preferred embodiment of the process according to the invention, the catalytic system added to the liquid sulfur comprises one or more compounds, each one having a basic character and surfactant properties.

The amount of catalytic system added to the liquid sulfur should be sufficient to obtain rapid removal of the $H_2S$ and, not be so high as to significantly increase the ash content of the liquid sulfur. The amount of catalytic system added to the liquid sulfur is preferably between about 0.5 and 60 ppm based on the weight of sulfur.

DETAILED DESCRIPTION OF THE INVENTION

Figure 1:
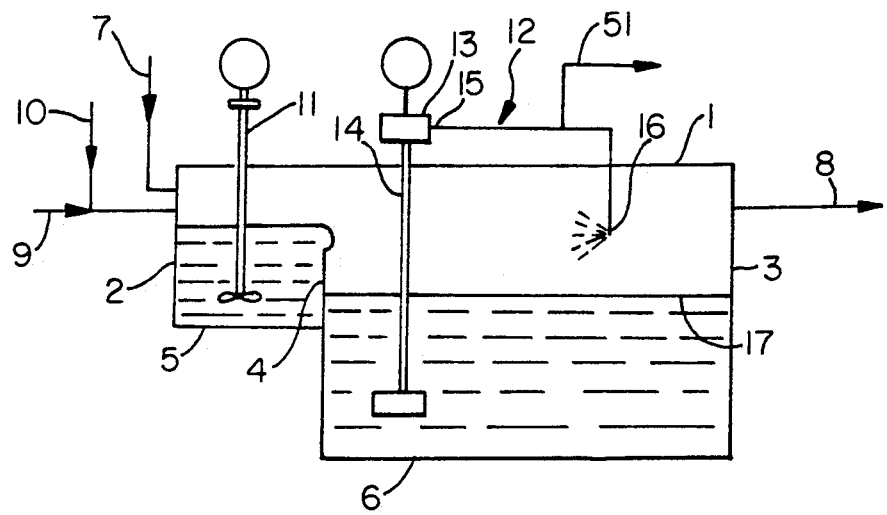
FIG. 1 is a diagrammatic representation of an embodiment of a process of the invention utilizing a mechanical mixing zone and one spray zone.

When the catalyst system added to the liquid sulfur is a two-component system, the compound or compounds of basic character that constitute one of the components of said catalyst system are selected from compounds of basic character in the sense of BRONSTEDT, which are stable in the liquid sulfur at the operation temperature or change at this temperature into a stable basic compound. The basic compounds can be in particular hydroxides of akali metals or alkaline-earth metals such as sodium, potassium or calcium, compounds such as ammonia, hydrazine, hydroxylamine, aliphatic or cyclic amines of the primary, secondary or tertiary type, compounds such as urea or thiourea and derivatives thereof, basic heterocyclic compounds, weak acid salts of strong bases, quaternary nitrogenous compounds that decompose at operating temperatures to yield ammonia or an amine. The basic compounds defined as catalysts in EP No. 0045636 and U.S. Pat. No. 3,447,903 are also suitable as the basic component of the catalytic system according to the invention.

Another preferred form of the basic component are heterocyclic monocyclic and heterocyclic polycyclic compounds that contain at least one nitrogen heteroatom. In addition to the nitrogen heteroatom, the heterocyclic compounds can contain other heteroatoms, such as sulfur and/or oxygen. The useful basic compounds are soluble and stable in the liquid sulfur at temperatures of treatment and have a boiling point above about 200° C. at atmospheric pressure. The heterocyclic compounds being proposed as catalysts for the removal of the $H_2S$ contained in the liquid sulfur in a patent application filed by the applicants at even date with this patent application are useful in the present process. The proposed catalysts include by way of examples, heterocyclic compounds such as quinoline, isoquinoline, benzoquinoline, acridine, benzacridine, quinoxaline, quinazoline, phenazine, phenantridine, phenantrolines, naphthyridines, bipyridyls.

As used herein, the phrase heterocyclic monocyclic compounds refers to heterocyclic compounds having only one ring, the ring having at least one heteroatom incorporated thereon. The heterocyclic monocyclic compounds can have substituents appended to the heterocyclic ring. The phrase heterocyclic polycyclic compounds, as used herein, refers to compounds having two or more cyclic moieties, which may be attached or fused, in which at least one of the cyclic moieties is a heterocyclic moiety having at least one heteroatom incorporated in the ring. Preferably two or more of the cyclic moieties are heterocyclic moieties in the polycyclic compound. The heterocyclic polycyclic compounds can have substituent appended thereto as long as the substituents do not eliminate the catalytic activity of the compound.

The surfactant compounds that are useful to form the surfactant component of the two-component catalytic system can be anionic, non-ionic, cationic or amphoteric surfactant compounds. Particularly useful surfactant compounds of the two-component catalytic system can be formed from one or more surfactant compounds selected from the surfactant compounds having little or practically no basic character such as anionic or non-ionic surfactant compounds and in particular the oxyethylated mercaptans, oxyethylated phenols, glycol polyethylene esters, derivatives of oxyalkylamides and polyethoxyesters of fatty acids. The surfactant component can be one or more cationic surfactant compounds, that is, surfactant compounds having a certain basic character.

The basic component and the surfactant component, the association of which forms the two-component catalyst system added to the liquid sulfur are used in proportions such that the amount of basic component preferably represents from 0.05 to 50%, and more preferably from 0.2 to 20%, of the total weight of said components.

When the catalytic system added to the liquid sulfur is a single component, that is, formed by one or more compounds each having a basic character and surfactant properties, said catalytic system preferably comprises one or more compounds selected from amino surfactant compounds and especially fatty amines, fatty alkylene diamines, salts and in particular the hydrochlorides and carboxylates of such fatty amines and diamines, the oxyalkylated derivatives of said fatty amines and diamines and the salts thereof, the quaternary ammonium compounds of fatty chains and the benzalconium salts. The phrase amino surfactant compound refers to compounds which have an amino group, have basis in the BRONSTEDT sense and have surfactant properties.

Among said amino surfactant compounds, the following are particularly useful in the practice of the present invention:

fatty amines of the formula

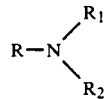

and salts thereof, especially hydrochlorides and carboxylates, alkylene diamines of fatty chains of the formula $R-NH-C_mH_{2m})-NH_2$ and salts thereof, especially hydrochlorides and carboxylates, oxyalkylated derivatives of fatty amines and fatty alkylene diamines having the respective formulae

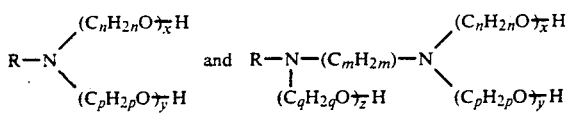

quaternary ammonium compounds containing fatty chains of the formula

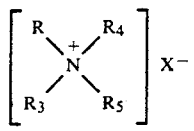

benzalconium salts of the formula

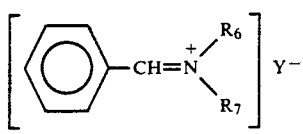

with R representing in these formulae an alkyl or alkenyl radical of from $C_8$ to $C_{22}$, $R_1$ and $R_2$, identical or different, each one designating an R radical, a hydrogen atom, or an alkyl radical of from $C_1$ to $C_4$, $R_3$, $R_4$ and $R_5$, identical or different, representing each an R radical or an alkyl radical of from $C_1$ to $C_4$, $R_6$ and $R_7$, identical or different, designating an alkyl radical of from $C_1$ to $C_4$, m, n, p and q representing integers of from 1 to 4 inclusive, x, y and z being numbers of from 1 to 10 inclusive and $X^-$ and $Y^-$ designating salifying anions, especially $Cl^-$ or carboxylates, such as for example, acetate.

The oxyalkylated derivatives of fatty amines and fatty alkylene diamines are preferably those corresponding to the formulae

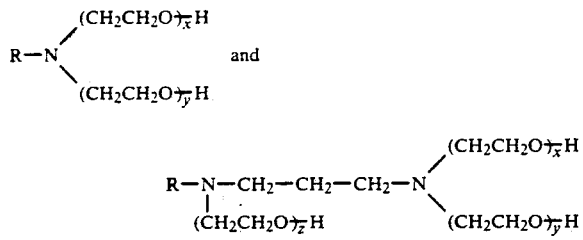

wherein R, x, y and z have the meanings given above.

The temperatures for carrying out the process according to the invention can vary very broadly above the melting point of the sulfur, for example, between about 125° C. and about 180° C. Preferably the process is carried out at temperatures of from about 130° C. to about 165° C.

The process according to the invention is carried out in a manner such that the catalytic system is distributed throughout the mass of liquid sulfur preferably in a homogeneous manner. The process is also conducted in a manner that permits hydrogen sulfide released by decomposition of the sulfanes and present in a dissolved state in the liquid sulfur to be separated from the liquid sulfur. The liquid sulfur containing the catalytic system can be subjected to stirring by any suitable mechanical system of stirring, the released $H_2S$ naturally escaping from the mass of liquid sulfur. The stirring of the liquid sulfur and the escape of the released $H_2S$ can also be carried out by stripping by means of an inert gas. As used herein, an inert gas is a gas which does not react with the constituents of the medium in which it is introduced under the conditions of temperature selected for carrying out the process, preferably the stripping gas is nitrogen, $CO_2$, air, water vapor, residual gas from a sulfur recovery plant, or mixtures of said gases. The stirring of the liquid sulfur that contains the catalytic system and the removal of the released $H_2S$ can likewise be effected by subjecting the liquid sulfur to an atomization or spraying such as described, for example, in U.S. Pat. No. 3,364,655. If necessary, the process can be carried out using a combination of these different modes of contacting the liquid sulfur with gas to eliminate the released $H_2S$. Countercurrent contact of the sulfur with an inert gas in a column can also be useful.

The treatment of the liquid sulfur that includes one, or a combination of the above-mentioned operations is generally effected in a heat-insulated vessel, for example, a metal tank or reservoir, wherein said liquid sulfur is stored.

It is preferred to sweep the vapor space above the open surface of the liquid sulfur in a storage tank, by means of an inert gas such as $CO_2$, nitrogen, air, residual gas of a CLAUS sulfur plant to remove the $H_2S$ to an incineration zone and thus facilitate the removal of the $H_2S$ released by decomposition of the sulfanes away from the mass of liquid sulfur. When the sweeping operation is effected by means of a residual gas from a sulfur plant that is, of a gas still containing a small amount of $H_2S$, said amount must be controlled, for example, by diluting the residual gas with an inert gas, in a manner such that, at least toward the end of the operation, the concentration of $H_2S$ in the sweeping gas is not above the content of gaseous $H_2S$ in equilibrium, at the temperature of the operation, with the amount of $H_2S$ tolerated in the liquid sulfur.

The catalytic system can be added to the liquid sulfur all at one time at the beginning of the operation or by fractions throughout the operation. When the treatment for elimination of $H_2S$ includes a mechanical agitation of the liquid sulfur contained in a metal vessel, tank, or reservoir where it is stored, the catalytic system can be added to the liquid sulfur entering the vessel serving for the treatment. If stripping is considered for eliminating the $H_2S$ from the mass of liquid sulfur, the catalytic system can be introduced in the stripping gas and/or added during the feeding of liquid sulfur to the treating vessel. In case an atomization or spraying of the liquid sulfur is effected, such an atomization generally includes the introduction of the liquid sulfur in an atomizing or spray nozzle by means of a pump, including a suction conduit immersed in the liquid sulfur. The catalytic system can be introduced into the pump suction or discharge and/or with the feed to the vessel for treatment of the liquid sulfur.

The process according to the present invention can be carried out batchwise or continuously.

Figure 2:
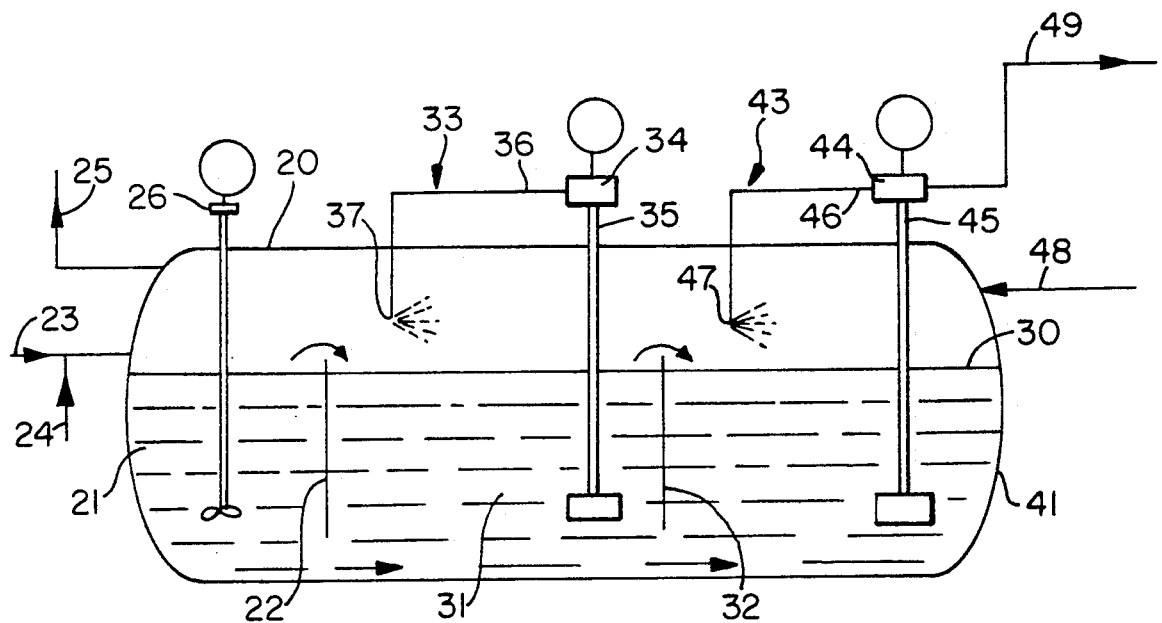
FIG. 2 is a diagrammatic representation of an embodiment of the process of the invention utilizing a mechanical zone and two spray zones.

FIGS. 1 and 2 of the enclosed drawing diagrammatically show two devices that can be used for carrying out the process according to the invention.

The process according to the invention with atomization of the liquid sulfur containing the catalytic system can be carried out batchwise for example, as shown in FIG. 1 by operating in a heat-insulated closed vessel 1, preferably a metal tank or reservoir divided into two compartments, namely, a first compartment 2 of small volume and a second compartment 3 of considerably volume, by a partition 4 open at the upper part so as to form an overflow allowing the liquid sulfur to flow from the first into the second compartment. The bottom 5 of the first compartment is raised in relation to bottom 6 of the second compartment. The vessel is provided with an inlet 7 for sweeping gas that enters the first compartment above the level of the sulfur and an outlet 8 for sweeping gas provided in the upper part of the second compartment. The first compartment is provided with a conduit 9 for introducing liquid sulfur, said conduit being in fluid communication with line 10 for adding the catalyst system, and equipped with mechanical means 11 for agitation, and the second compartment is equipped with a system 12 for spraying including a pump 13 whose suction conduit 14 is adapted to be submerged in the liquid sulfur and the discharge 15 is connected to a spray nozzle 16 situated in said second compartment so as to be placed above the open surface 17 of the liquid sulfur contained in this compartment.

In such a manner of carrying out the process, the liquid sulfur that contains the catalytic system is subjected to strong agitation in the first compartment 2 which distributes the catalytic system in the liquid sulfur contained in said compartment to initiate the decomposition reaction of the sulfanes, then the mixture of liquid sulfur and catalytic system flows by the overflow 4 into the second compartment 3 in which said mixture is subjected to spraying or atomization. The $H_2S$ that escapes from the mass of liquid sulfur contained in the two compartments is removed by circulation of the sweeping gas, for example, a residual gas from a CLAUS sulfur plant and carried by the gas to an incineration zone. When the $H_2S$ content of the liquid sulfur has been reduced to the required level, the liquid sulfur can be pumped from compartment 3 through conduit 51.

The process according to the invention can be carried out continuously with spraying or atomization of the liquid sulfur containing the catalytic system, for example, as shown in FIG. 2, by operating in a heat-insulated closed vessel 20 such as a heat-insulated metal reservoir divided into at least three successive compartments namely, an inlet compartment 21, one or more intermediate compartments 31 and an outlet compartment 41, by parallel vertical partitions 22 and 32 which are open at the lower part for connecting each one of the compartments with the compartments that are adjacent, said partitions being of a height lesser than that of the vessel so as to be able, should that be the case, to permit overflow of the liquid sulfur. The inlet compartment 21 is provided with a conduit 23 for introducing the liquid sulfur. The conduit 23 is in fluid communication with a conduit 24 for adding the catalytic system. Vessel 20 in its upper part has an outlet 25 for a sweeping gas, and is equipped with a mechanical agitation system 26. Each of the intermediate compartment(s) 31 and the outlet compartment 41 are equipped with an atomization or spray system 33 and 43, said system including a pump 34 and 44 with suction conduits 35 and 45 adapted to submerge in the liquid sulfur in the downstream part of the compartment concerned and, with discharge conduits 36 and 46 connected to atomization or spray nozzles 37 and 47 placed in said compartment in the upstream part of the compartment above the open surface 30 of the liquid sulfur it contains. In addition, the outlet compartment 41 is provided with an inlet 48 for a sweeping gas arranged above the open surface 30 of the liquid sulfur and the pump of the spray system in said compartment communicates with a conduit 49 that serves to remove the treated liquid sulfur.

In such a manner of carrying out the process, the liquid sulfur with the added catalytic system continuously arrives at the inlet compartment 21 and is there subjected to vigorous agitation which leads to a homogeneous distribution of the catalytic system in the liquid sulfur contained in said compartment, to initiate decomposition reaction of the sulfanes, then the mixture of liquid sulfur and catalytic system flows continuously and successively into the intermediary compartments 31, then into the outlet compartment 41, said mixture being subjected to a spraying in each one of said compartments. The $H_2S$ that escapes from the mass of liquid sulfur contained in the different compartments is continuously removed from the vessel mixed with the sweeping gas such as a residual gas of a CLAUS sulfur plant which is injected into the outlet compartment 41 and circulates above the open surface 30 of the liquid sulfur countercurrent to the latter, then it leaves the vessel by the outlet 25 provided for this purpose in the inlet compartment 21; the sweeping gas loaded with $H_2S$ being then directed to an incineration zone. The liquid sulfur treated is continuously drawn off by the conduit 49 mounted on the pump 44 of the spray system 43 that is arranged in the outlet compartment 41 of the vessel 20.

By way of variation, the operation of spraying the mixture of liquid sulfur and catalytic system provided in the discontinuous process, or at least one of the spraying operations provided in the continuous process, can be replaced by a stripping operation of the $H_2S$ by means of an inert gas injected into the liquid sulfur contained in the compartment(s) of the treatment vessel. In the device of FIG. 1, the compartment 2 can be eliminated, the liquid sulfur and the catalytic system being directly introduced in the compartment 3 which then constitutes the only compartment of the vessel.

The invention is illustrated by the examples that follow which are non-limiting.

EXAMPLES 1 TO 4

In these examples, which are control examples, the $H_2S$ contained in the liquid sulfur originating from a CLAUS sulfur unit was removed by working either in the absence of catalyst (example 1) or in the presence of a catalyst consisting of sodium hydroxide in a 3% solution in n-decanol (example 2) or ammonia (example 4), or also in the presence of only one surfactant compound without basic character, namely, the oxyethylated tertiododecyl mercaptan containing 7 ethylene oxide groups (example 3).

The process was carried out in a glass flask kept at constant temperature in a bath of oil controlled by a thermostat. The flask was provided with a first nozzle through which passed a glass dip tube for introducing a stripping gas, a second nozzle through which passed a glass tube for introducing a sweeping gas, the end of said tube being situated approximately two centimeters above the open surface of the liquid sulfur, and a third nozzle for injection of the catalyst and for drawing off samples of liquid sulfur, said flask having in addition an outlet for the gases connected to a discharge conduit and a system for trapping the $H_2S$.

In the flask was placed 1 kg of liquid sulfur collected at the exit of a sulfur unit condenser, said sulfur was kept at a temperature of 140° C. (examples 1 to 3) or 150° C. (example 4). The process was begun by introducing into the flask, through the dip tube, 50l/h nitrogen by way of a stripping gas and, through the sweeping tube, 120l/h air as sweeping gas and from the flask was evacuated by the appropriate conduit 170l/h of a gaseous effluent that was directed to the trapping system. At specific intervals, samples of liquid sulfur were removed and the amount of the $H_2S$ and the sulfanes that they contained were determined by argentimetry or iodometry. The end point of the determination was detected by potentiometry at the accuracy of bimetallic electrodes.

The result of the determination was reported as "total $H_2S$" and represents the sum of the contents in the liquid sulfur respectively of free $H_2S$ and of $H_2S$ combined in the form of sulfanes.

In examples 2 and 3 the catalyst or additive was introduced into the flask by means of a microsyringe through a septum that sealed the third nozzle of the flask, at the beginning of the process. The amount of catalyst or additive was 50 ppm by weight based on the weight of liquid sulfur. In example 4, there were effected two additions of 25 ppm ammonia into the liquid sulfur by addition to the stripping gas, the first addition was made at the beginning of the experiment (Duration of treatment=0) and the second addition at the end of one hour.

The results obtained are shown in Table I.

EXAMPLES 5 TO 10

In these examples, the $H_2S$ contained in the liquid sulfur originating from a condenser of a CLAUS sulfur plant was removed by using a catalytic system according to the invention of the two-component type.

The work was carried out in a device similar to the one used in the control examples and at 140° C. (examples 5 to 8) or 150° C. (examples 9 and 10) with a stripping gas rate of 60 l/h (examples 5 to 8) or 100 l/h (examples 9 and 10), the sweeping gas rate was 120 l/h for the different examples. The amounts of catalyst system used changed from example to example.

The nature and quantity of the catalyst system used in each one of the examples and the results obtained are shown in Table II.

The comparison of the results of examples 5 to 8 with those of the control examples demonstrates the effectiveness of the two-component catalytic system according to the invention which makes it possible to obtain "total $H_2S$" contents in the liquid sulfur that are less than 10 ppm at the end of a period of treatment substantially shorter than that needed when using a basic catalyst alone (Control examples 2 and 4) or a non-basic surfactant compound alone (example 3).

TABLE 1

| EXAMPLE | CATALYTIC SYSTEM or ADDITIVE | DURATION OF TREATMENT (min.) | "TOTAL $H_2S$" CONTENT OF THE LIQUID SULFUR (ppm) |
|---|---|---|---|
| 1 | NONE | 0 | 145 |
|   |   | 30 | 133 |
|   |   | 60 | 120 |
|   |   | 90 | 113 |
|   |   | 120 | 103 |
| 2 | Na OH in solution at 3% by weight in n-decanol | 0 | 136 |
|   |   | 30 | 128 |
|   |   | 60 | 118 |
|   |   | 90 | 108 |
|   |   | 120 | 96 |
| 3 | TDM.7 (O.E)* | 0 | 158 |
|   |   | 30 | 141 |
|   |   | 60 | 126 |
|   |   | 90 | 115 |
|   |   | 120 | 85 |
| 4 | $NH_3$ | 0 | 465 |
|   |   | 60 | 284 |
|   |   | 120 | 132 |
|   |   | 240 | 18 |
|   |   | 300 | 9.5 |

*TDM.7 (O.E) = oxyethylated tertiododecyl mercaptan containing 7 ($OCH_2CH_2$) groups.

TABLE II

| EXAMPLE | CATALYTIC SYSTEM (nature and quantity) | DURATION OF TREATMENT (min.) | "TOTAL $H_2S$" CONTENT OF THE LIQUID SULFUR (ppm) |
|---|---|---|---|
| 5 | TDM.7 (OE) containing 3% by weight NaOH 50 ppm | 0 | 135 |
|   |   | 15 | 55 |
|   |   | 30 | 7 |
|   |   | 45 | <1 |
| 6 | TDM.7 (OE) containing 3% by weight NaOH 25 ppm | 0 | 160 |
|   |   | 15 | 80 |
|   |   | 30 | 13 |
|   |   | 45 | 7 |
|   |   | 60 | <1 |
| 7 | TDM.7 (OE) containing 3% by weight NaOH 25 ppm | 0 | 702 |
|   |   | 30 | 33 |
|   |   | 60 | <2 |
| 8 | Nonylphenol.7 (OE)* containing in solution 0.6% by weight NaOH | 0 | 150 |
|   |   | 15 | 74 |
|   |   | 30 | 25 |
|   |   | 30 | 9 |

TABLE II-continued

| EXAMPLE | CATALYTIC SYSTEM (nature and quantity) | DURATION OF TREATMENT (min.) | "TOTAL H₂S" CONTENT OF THE LIQUID SULFUR (ppm) |
|---|---|---|---|
|  | 30 ppm | 45 | 5 |
| 9 | TDM.7 (OE) | 0 | 473 |
|  | containing 3% by | 10 | 263 |
|  | weight NaOH | 30 | 67 |
|  |  | 70 | 31 |
|  | 46 ppm | 95 | 18 |
|  |  | 120 | 8.5 |
| 10 | Nonylphenol.7 (OE)* | 0 | 469 |
|  | containing in | 10 | 56 |
|  | solution 0.6% by | 20 | 10 |
|  | weight NaOH |  |  |
|  | 50 ppm | 30 | <2 |

*Ethoxylated nonylphenol containing 7 (OCH₂CH₂) groups.

EXAMPLES 11 TO 21

In these examples, the H₂S contained in the liquid sulfur originating from a condenser of CLAUS sulfur unit was removed by using a catalytic system of the mono-component type according to the invention. The catalytic system consisted of a compound which has both basic properties and surfactant properties.

The work was carried out in a device similar to the one used in the control examples with stripping gas and sweeping gas rates respectively equal to 100 l/h and 120 l/h, the nature and quantity of the catalytic system and the temperature of treatment changed from one example to the other.

The monocomponent catalytic systems used in the different examples were selected from the following amino surfactant compounds (commercial names in parentheses):

(A) Diamine propylene tallow of the formula RNH—(CH₂)₃—NH₂ wherein R represents an aliphatic radical with from C₁₄ to C₂₀ (DINORAM S)

(B) N, N', N'-polyoxyethylene N-tallow propylene diamine of the formula

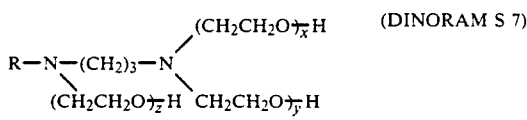 (DINORAM S 7)

wherein R represents an aliphatic radical having from C₁₄ to C₂₀ and x+y+z=7

(C) Polyoxyethylene tallow amine of the formula

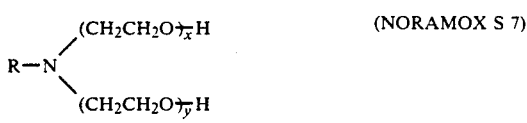 (NORAMOX S 7)

wherein R represents an aliphatic radical having from C₁₄ to C₂₀ and (x+y)=7.

(D) Polyoxyethylene tallow amine of a formula analogous to the one defined under (C) but with x+y=5 (NORAMOX S 5).

(E) N-bis hydroxy-2 ethyl cocoamine of the formula

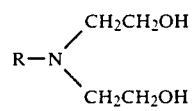

wherein R represents an aliphatic radical having from C₁₀ to C₁₈ (NORAMOX C2).

(F) Di-cocomethyl amine of the formula

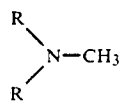

wherein R represents an aliphatic radical having from C₁₀ to C₁₈ (NORAM M2C).

(G) Di(hydrognated tallow) dimethylammonium chloride of the formula

 (NORAMIUM M2SH)

wherein R represents an alkyl radical having from C₁₆ to C₁₈.

(H) Dimethyl benzalconium chloride of the formula

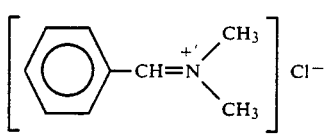

The specific conditions of the different examples and the results obtained are shown in Table III.

The comparison of the results of examples 11 to 21 with those of the control examples clearly shows the effectiveness of the monocomponent form of the catalytic system according to the invention which results in very short treatment time for reducing the "total H₂S" content of liquid sulfur below 10 ppm.

TABLE III

| EXAMPLE | CATALYTIC SYSTEM (nature and quantity) | TREATMENT Temperature (°C.) | TREATMENT Duration (min.) | "TOTAL H₂S" CONTENT OF THE LIQUID SULFUR (ppm) |
|---|---|---|---|---|
| 11 | A | 135 | 0 | 452 |

TABLE III-continued

| EXAMPLE | CATALYTIC SYSTEM (nature and quantity) | TREATMENT Temperature (°C.) | Duration (min.) | "TOTAL H₂S" CONTENT OF THE LIQUID SULFUR (ppm) |
|---|---|---|---|---|
|  | 53 ppm |  | 6 | 33 |
|  |  |  | 18 | 4 |
|  |  |  | 20 | <2 |
| 12 | B | 135 | 0 | 450 |
|  | 46 ppm |  | 4 | 68 |
|  |  |  | 15 | <2 |
| 13 | C | 135 | 0 | 477 |
|  | 49 ppm |  | 4 | 83 |
|  |  |  | 12 | 8 |
|  |  |  | 20 | <1 |
| 14 | D | 135 | 0 | 534 |
|  | 30 ppm |  | 4 | 106 |
|  |  |  | 10 | 24 |
|  |  |  | 17 | <2 |
| 15 | D | 150 | 0 | 504 |
|  | 30 ppm |  | 4 | 182 |
|  |  |  | 12 | 48 |
|  |  |  | 19 | 24 |
|  |  |  | 32 | <2 |
| 16 | D | 165 | 0 | 504 |
|  | 30 ppm |  | 4 | 274 |
|  |  |  | 12 | 173 |
|  |  |  | 30 | 122 |
|  |  |  | 55 | 78 |
|  |  |  | 168 | <2 |
| 17 | D | 135 | 0 | 458 |
|  | 9 ppm |  | 10 | 19 |
|  |  |  | 20 | <2 |
| 18 | E | 150 | 0 | 508 |
|  | 30 ppm |  | 5 | 103 |
|  |  |  | 13 | 20 |
|  |  |  | 22 | <2 |
| 19 | F | 150 | 0 | 529 |
|  | 46 ppm |  | 5 | 111 |
|  |  |  | 13 | 25 |
|  |  |  | 20 | 4 |
|  |  |  | 22 | <2 |
| 20 | G | 150 | 0 | 451 |
|  | 30 ppm |  | 6 | 184 |
|  |  |  | 15 | 30 |
|  |  |  | 21 | 10 |
|  |  |  | 30 | <2 |
| 21 | H | 150 | 0 | 510 |
|  | 39 ppm |  | 12 | 50 |
|  |  |  | 20 | 8 |
|  |  |  | 25 | <2 |

What is claimed is:

1. In a process for the removal of H₂S present in liquid sulfur in a dissolved state or combined as hydrogen polysulfides wherein a catalyst system comprising at least one basic compound is admixed with the liquid sulfur and the H₂S is separated from the liquid sulfur, the improvement which comprises including in the catalyst system at least one surfactant compound and wherein said H₂S is separated as a gas.

2. The process of claim 1 wherein the catalyst system comprising at least one basic compound and at least one surfactant compound are added to the liquid sulfur as a mixture.

3. The process of claim 1 wherein the catalyst system comprises at least two components comprising at least one basic compound as a first component and at least one surfactant compound as the second component and wherein the first and second components are added to the liquid sulfur separately.

4. The process of claim 1 wherein the catalyst system contains from about 0.05 to about 50% by weight of the at least one basic compound.

5. The process of claim 4 wherein the catalyst system contains from about 0.2 to about 20% by weight of the at least one basic compound.

6. The process of claim 1 wherein the catalyst system consists essentially of one component which component comprises at least one compound having basic properties and surfactant properties.

7. The process of claim 6 wherein the catalyst system is formed from at least one amino surfactant compound.

8. The process of claim 7 wherein the amino surfactant compound is at least one compound selected from the group consisting of fatty amines, fatty alkylene diamines, salts of fatty amines, salts of fatty diamines, oxyalkylated derivatives of fatty amines, oxyalkylated derivatives of fatty diamines, salts of oxyalkylated fatty amines, salts of oxyalkylated fatty diamines, fatty quaternary ammonium compounds and benzalconium salts.

9. The process of claim 7 wherein the amino surfactant catalyst is at least one compound selected from the group consisting of:

fatty amines of the formula

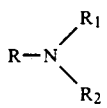

and the salts thereof;
alkylene diamines of fatty chains of the formula R—NH—($C_mH_{2m}$)—$NH_2$ and the salts thereof;
oxyalkylenated derivatives of fatty amines and fatty alkylene diamines of the formulae

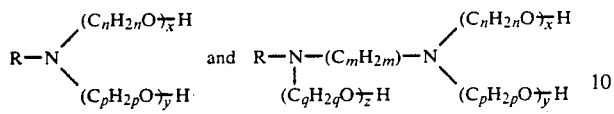

aliphatic quaternary ammonium compounds of the formula

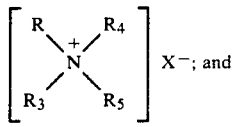

benzalconium salts of the formula

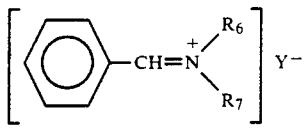

wherein R is a $C_8$ to $C_{22}$ alkyl or $C_8$ to $C_{22}$ alkenyl radical, $R_1$ and $R_2$ independently represent a hydrogen atom or a $C_1$ to $C_4$ alkyl radical, $R_3$ to $R_5$ independently represent an R radical or a $C_1$ to $C_4$ alkyl radical, $R_6$ and $R_7$ independently represent a $C_1$ to $C_4$ alkyl radical, m, n, p and q represent integers of from 1 to 4 inclusive, x, y and z represent a number of from 1 to 10 inclusive, and $X^-$ and $Y^-$ represent salifying anions.

10. The process of claim 1, wherein the amount of catalyst system added to the liquid sulfur is between about 0.5 to 60 ppm based on the weight of the sulfur.

11. The process according to claim 1 wherein the liquid sulfur is contacted with the catalyst system at a temperature from about 130° C. to 165° C.

12. The process according to claim 1 wherein the liquid sulfur containing the catalyst system is agitated by mechanical agitation means.

13. The process of claim 1 wherein the liquid sulfur containing the catalyst system is agitated by spraying the liquid sulfur containing the catalyst system.

14. The process of claim 1 wherein an inert gas is introduced into the liquid sulfur containing the catalyst system whereby the liquid sulfur containing the catalyst system is agitated and the $H_2S$ is separated from the liquid sulfur.

15. The process according to claim 12 wherein the open surface of the liquid sulfur containing the catalytic system is swept with an inert gas to separate the $H_2S$ from the liquid sulfur.

16. The process according to claim 13 wherein the open surface of the liquid sulfur containing the catalytic system is swept with an inert gas to separate the $H_2S$ from the liquid sulfur.

17. The process according to claim 14 wherein the open surface of the liquid sulfur containing the catalytic system is swept with an inert gas to separate the $H_2S$ from the liquid sulfur.

18. The process of claim 7, wherein the amino surfactant catalyst is one compound selected from the group consisting of:
a propylene diamine of formula R—NH—($CH_2$)$_3$—$NH_2$, wherein R is an aliphatic radical with from $C_{14}$ to $C_{20}$;
an amine of formula

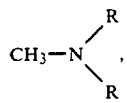

wherein R represents an aliphatic radical having from $C_{10}$ to $C_{18}$;
a quaternary ammonium compound of formula

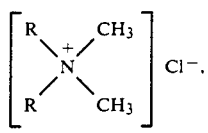

wherein R represents an alkyl radical having from $C_{16}$ to $C_{18}$; and
dimethyl benzalconium chloride of formula

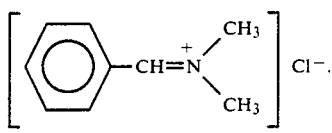

19. A mixture consisting of liquid sulfur, $H_2S$ present in the liquid sulfur, in a dissolved state and combined as hydrogen polysulfide, and at least one compound which has simultaneously a basic character and surfactant properties.

20. A mixture of claim 19 comprising at least one amino surfactant compound.

21. A mixture of claim 20 wherein the amino surfactant compound comprises at least one compound selected from the group consisting of fatty amines, fatty alkylene diamines, salts of fatty amines, salts of fatty alkylene diamines, oxyalkylated derivatives of fatty amines, oxyalkylated derivatives of fatty diamines, salts of oxyalkylated derivatives of fatty amines, salts of oxyalkylated derivatives of fatty diamines, aliphatic quanternary ammonium compounds and benzalconium salts.

22. The mixture of claim 21 wherein the amino surfactant compound is at least one compound selected from the group consisting of:
fatty amines of the formula

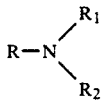

and the salts thereof;
aliphatic alkylene diamines of the formula R—NH—($C_mH_{2m}$)—$NH_2$ and the salts thereof;
oxyalkylated of fatty amines and fatty alkylene diamines of the formulae

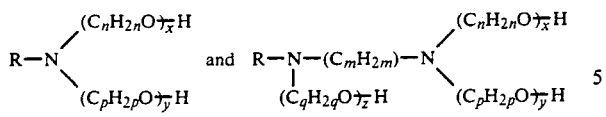

quaternary ammonium compounds of the formula

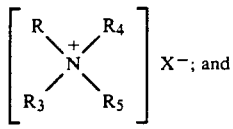

benzalconium salts of the formula

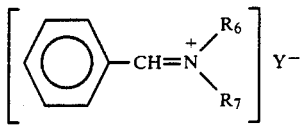

wherein R is a $C_8$ to $C_{22}$ alkyl radical or a $C_8$ to $C_{22}$ alkenyl radical, $R_1$ and $R_2$ independently represent an R radical, a hydrogen atom or a $C_1$ to $C_4$ alkyl radical, $R_3$, $R_4$ and $R_5$ independently represent an R radical or a $C_1$ to $C_4$ alkyl radical, $R_6$ and $R_7$ independently represent a $C_1$ to $C_4$ alkyl radical, m, n, p and q represent integers of from 1 to 4 inclusive, x, y and z represent a number of from 1 to 10 inclusive, and $X^-$ and $Y^-$ designate salifying anions.

23. The mixture of claim 20, wherein the amino surfactant compound is one compound selected from the group consisting of:

a propylene diamine of formula $R-NH-(CH_2)_3-NH_2$, wherein R is an aliphatic radical with from $C_{14}$ to $C_{20}$;

an amine of formula

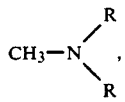

wherein R represents an aliphatic radical having from $C_{10}$ to $C_{18}$;

a quaternary ammonium compound of formula

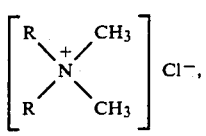

wherein R represents an alkyl radical having from $C_{16}$ to $C_{18}$; and dimethyl benzalconium chloride of the formula

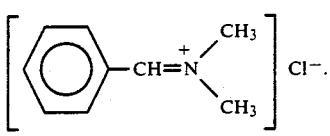

24. A mixture consisting of liquid sulfur, $H_2S$ present in the liquid sulfur, in a dissolved state and combined as hydrogen polysulfide, at least one basic compound, and at least one surfactant.

25. The mixture of claim 24, wherein the amount of the basic compound represents from 0.05 to 50% by weight of the amount of basic compound and surfactant in the mixture.

* * * * *

UNITED STATES PATENT AND TRADEMARK OFFICE
CERTIFICATE OF CORRECTION

PATENT NO. : 5,004,591

DATED : April 2, 1991

INVENTOR(S) : Jacques Maurice, et al

It is certified that error appears in the above-identified patent and that said Letters Patent is hereby corrected as shown below:

Column 4, line 48: "have" (second occurrence) should read --are-- line 49: "basis" should read --basic-- line 65: in the formula the radical "$-C_mH_{2m}\mathbin{)}$" should read -- $\mathbin{(}C_mH_{2m}\mathbin{)}$ --

Column 7, line 2: "considerably" should read --large--

Column 16, line 51: "quanternary" should read --quaternary--.

Signed and Sealed this

Twenty-third Day of March, 1993

Attest:

STEPHEN G. KUNIN

*Attesting Officer*  *Acting Commissioner of Patents and Trademarks*